US011153276B1

(12) United States Patent
Keyerleber

(10) Patent No.: US 11,153,276 B1
(45) Date of Patent: Oct. 19, 2021

(54) SECURE DATA ROUTING AND RANDOMIZATION

(71) Applicant: N3XTWORK, LLC, Lutz, FL (US)

(72) Inventor: John P. Keyerleber, Richmond Heights, OH (US)

(73) Assignee: N3XTWORK, LLC, Lutz, FL (US)

( * ) Notice: Subject to any disclaimer, the term of this patent is extended or adjusted under 35 U.S.C. 154(b) by 160 days.

(21) Appl. No.: 16/683,146

(22) Filed: Nov. 13, 2019

Related U.S. Application Data

(60) Provisional application No. 62/768,005, filed on Nov. 15, 2018.

(51) Int. Cl.
*H04L 29/06* (2006.01)
(52) U.S. Cl.
CPC ........ *H04L 63/0236* (2013.01); *H04L 63/029* (2013.01); *H04L 63/0272* (2013.01)
(58) Field of Classification Search
CPC .......................... H04L 63/0236; H04L 63/029; H04L 63/0272
See application file for complete search history.

(56) References Cited

U.S. PATENT DOCUMENTS

2001/0050914 A1* 12/2001 Akahane ............. H04L 12/4608
370/382
2020/0014619 A1* 1/2020 Shelar ................... H04L 45/125

* cited by examiner

*Primary Examiner* — Huan V Doan
(74) *Attorney, Agent, or Firm* — Jon E. Holland, Esq.; Maynard Cooper & Gale. P.C.

(57) ABSTRACT

A networked device creates a plurality of concurrent communication channels within a VPN tunnel between two networks, each channel being identifiable only by a set of IP addresses that are anonymized from the actual IP address of the communication endpoints. Traffic sent from the first network to the second may take any of a plurality of channels, with a randomized channel assignment on a per packet basis. By these means, the endpoints of communication are obfuscated. Further, transmitted data is spread apart or scattered across multiple channels, therefore, an eavesdropper would not have access to the entirety of a data communication.

16 Claims, 9 Drawing Sheets

SECURE DATA ROUTING AND RANDOMIZATION

This application claims priority to U.S. Provisional Patent Application No. 62/768,005 entitled SECURE DATA ROUTING AND RANDOMIZATION and filed on Nov. 15, 2018.

BACKGROUND

Data transmitted between two computing systems may travel via defined paths or routes, through any of a variety of publicly accessible networks (e.g., the Internet), and may use any of a variety of media, such as Ethernet or fiber cabling. In known methods of data transmission across networks, data routing is performed based on an external internet protocol address (IP address). Data packets are generally forwarded across multiple routers to the requested IP address by the fastest path available at the time of transmission, with the packet's destination visible upon inspection.

Whenever data is moved between two points, there is a potential risk of unauthorized access to that data by an eavesdropper or other unauthorized actor. Conventional techniques to secure the transmission of confidential information typically rely upon data being encrypted by a sufficiently complex single encryption algorithm. For example, a virtual private network (VP N) establishes a virtual point-to-point connection (a tunnel) in which data is encrypted when it leaves one location and is decrypted at its destination, where both source and destination are identified by unique, attributable IP addresses. Any intermediate stops (hops) are also identifiable by their assigned IP address.

In the scenario above, two types of unauthorized users may attempt to access the transmitted data. First, an unauthorized user with access to an applicable encryption key (e.g., an employee of the source client that generated the data or a knowledgeable malicious actor) could observe the transmission and be able to decrypt and read the entirety of the communication. Next, an unauthorized user with no access to the applicable encryption key (e.g., an eavesdropper) may not be able to read the actual content of a communication, but may still be able to derive relevant information about the data transmission merely from observation, such as one or more of its destination, its source, its intermediate hops, the relative size (number of packets) of the transmission, the transmission type (e.g., based on destination port), and the like. Either of these bad actors could observe, capture, manipulate, divert, and/or log information about these types of transmissions. What is more, even with respect to an eavesdropper that does not have an encryption key, the actual content of a transmission may not be safe, as it is possible that a previously-accessed encrypted transmission may later become accessible. As computing resources improve, increasingly complex methods of encryption are subject to being "cracked" or broken, rendering such encryption useless. Once the encryption algorithm is broken, a hacker may be able to read unauthorized data that they previously obtained and stored.

Accordingly, reliable solutions for maintaining the security of transmitted data are generally desired.

BRIEF DESCRIPTION OF THE DRAWINGS

The above and other features of the present disclosure, its nature and various advantages will be more apparent upon consideration of the following detailed description, taken in conjunction with the accompanying drawings in which.

Figure 1:
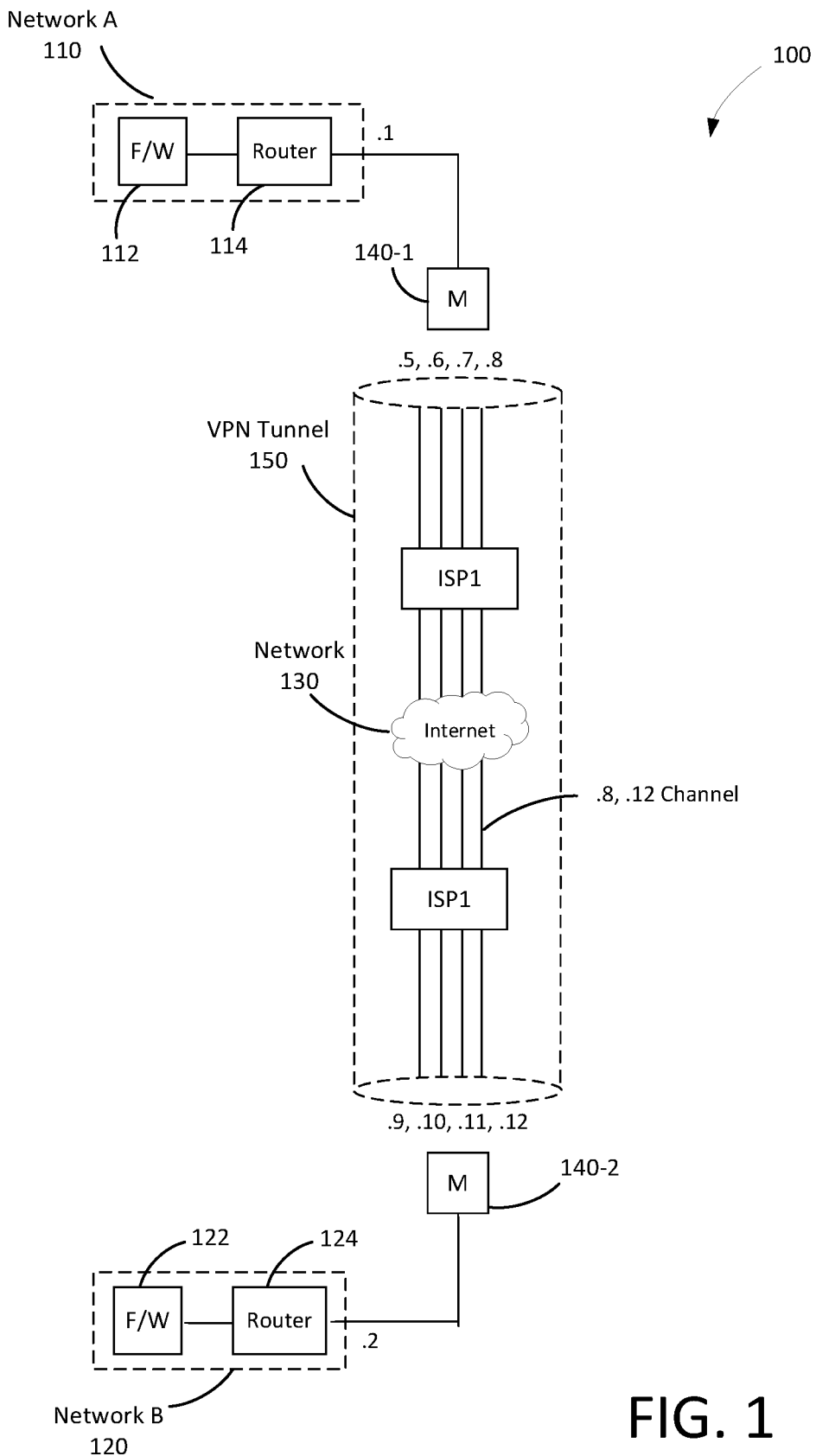
FIG. 1 depicts a diagram of a system for secure data transmission in accordance with some embodiments of the present disclosure.

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

The methods and systems described herein may be used to securely transmit TCP/IP traffic of any type, over any media, between two remote points, such that in a man-in-the-middle scenario, an unauthorized eavesdropper would be unable to obtain or observe the entirety of a transmitted communication. In one embodiment, a plurality of network communication channels are created in advance of the ingress of the associated data packets into a VPN. Each communication channel creates a connection between two respective, typically remote source and destination networks. In the exemplary embodiment, multiple concurrently-existing channels are created between a first, source network and a second, destination network, such that traffic sent from the first network to the second network may take any of a plurality of paths. In some embodiments, a channel for transmission is assigned on a per packet basis. In some embodiments, that assignment is random, and in other embodiments, one or more other packet parameters may be set to increase network security, reduce communication latency, and the like.

As used herein, a channel is a defined path of ingress and egress from a VPN through which data units (e.g., packets) can flow, the path being designated by endpoint IP addresses. In other embodiments, a VPN is not required, and the packets may ingress/egress through any public or private network(s). In the exemplary embodiment, the endpoint IP addresses are assigned at the time the channel is established.

While in the VPN (or other intermediate network(s)), the data packets may travel in their usual manner.

In some embodiments, the flow of data is enabled through the configuration of one or more rulesets that direct and control TCP/IP network traffic. Some embodiments of the systems and methods described herein may use the iptables interface to configure such rulesets within a Linux kernel firewall, by filtering or managing packet traffic leaving a network, however other embodiments may use other utilities or programs. Of course, the embodiments are not limited to the use of iptables, and in other embodiments, whether implemented in the Linux kernel or not, one or more other packet filtering frameworks may be used to manage incoming and/or outgoing traffic between networks.

In one embodiment, a secure data routing module is communicatively connected with (or is partially implemented within) a router on a first, source network through which module data traffic into and out of a network may flow. The module is configured, in an exemplary embodiment, to establish a plurality of communication channels with a network device on least one other remote network that is an intended endpoint of a packet transmission. In an exemplary embodiment, each of the channels is a logical channel, that is, a logical connection between two assigned IP addresses designed to define a path for transfer of one or more data packets. The IP addresses assigned for the channels at the source channel endpoint are different than the host IP address for the networked router or any other locally networked device. Similarly, the IP addresses assigned for the channels at the destination channel endpoint are different than the addresses of the networked devices local to that respective network. Rather, the channel endpoint IP addresses are assigned upon establishing the channel. Data viewed during the process of transmission may be identified by one or both of the channel endpoints, and not by the addresses of the ultimate endpoints of transmission. By these means, the transmission endpoints are anonymized, such that the packet is not attributable to the source router or the destination router.

In the exemplary embodiment, before transmitting a packet to the endpoint, the secure data routing module marks each packet with a piece of metadata (e.g., a flag), the range of possible marks corresponding to the number of the plurality of created channels. By reviewing the mark, the module can determine which of the available gateways the outgoing packet should be forwarded to. Put another way, the secure data routing module filters the incoming packet sequence to reroute specifically marked packets into one of a plurality of queues for outbound transmission from a set of defined gateways. In contrast with conventional solutions, each packet is marked and placed in a corresponding queue rather than being sent to a default gateway.

In some embodiments, this metadata is set based on a random number determination, viz., randomly assigned. In the exemplary embodiment, this method of forwarding respective packets over differing ones of multiple gateways is done irrespective of maintaining integrity of a single data communication (i.e., a stream of data may be split between gateways) and is done irrespective of a data type or packet type/encapsulation. Because of this, in the exemplary embodiment, the packets that make up a single, integral communication may egress from separate gateways. An observer of outgoing traffic would not see this communication as a single stream of data from one IP address to another, but rather, would see a set of transmissions from a plurality of source IP addresses.

In some embodiments, a secure data routing module may be communicatively connected with (or partially implemented within) a router at a second, destination network, where a plurality of channels have been established between a secure data routing module at the first, source network and a second secure data routing module into which data packets ingress into the second, destination network. This module is configured to recognize and receive packet data transmitted over any of the channels, reconstruct this data to assemble the original communication generated by a client on the source network, and transmit the reconstructed communication to the intended recipient on the second network.

In conventional processes of secure data routing, a source network may have a firewall and a router that facilitates packet data transmission to an internet service provider (ISP), out to a public network (e.g., the internet), and then to a destination ISP and destination router. The router then forwards the packet to the next destination router, or to the ultimate endpoint for the transmission. To secure the integrity and privacy of these data transmissions, the source and destination network devices may direct packet traffic through a virtual private network (VPN) tunnel in which data is encrypted (at the source) and decrypted (at the destination). The transmitted data packets still follow the same physical path of transmission that they would have absent the VPN, but have been encrypted by at least one complex encryption algorithm before passing through any public networks.

In these conventional solutions, an observer of data traffic (an eavesdropper) may observe the data transmissions as they pass through the VPN (e.g., over the internet), and may determine and/or log information associated with the transmission, for example its source and destination IP addresses and/or its length, but would need an encryption key for the applied algorithm to gain access to the unencrypted data itself. In a case that the applied encryption algorithm is compromised (e.g., by an actor with the encryption key (a knowledgeable actor) or an external actor capable of cracking the encryption algorithm), the observed data can be decrypted and the communication can be read and understood in its entirety. While increasingly complex encryption techniques are being developed, such solutions will only be effective until those techniques too are compromised, an outcome that grows ever more possible as computing resources become an increasingly available commodity. Further, increased complexity of encryption/decryption processing overhead adds to overall resource costs and contributes to network latency. To address this latency, some industry specialists have directed focus to optimizing circuits and bandwidth to accommodate more rigorous encryption.

In contrast to the conventional systems, the systems and methods described herein provide security of transmission by obfuscating the IP addresses of the ultimate source and ultimate destination of a packet being transmitted (or of a hop between routers made by the packet during transmission) by assigning temporary (i.e., dismantleable) routing paths with IP addresses that mask a dedicated host IP address. In various embodiments described herein, each data packet is sent over an unpredictable one of multiple generated paths. Because of this unpredictability, an eavesdropper will not be able to determine which path(s) to listen to in order to observe all packets in the entire, finite communication. Further, even if the eavesdropper identifies and observes one of the generated channels of communication, the data transmitted over that channel comprises only a fraction of the total packets of the transmission. Even if the eavesdropper realizes that some subset of packets is missing, they will still be unaware of what percentage of packets is missing and/or how many other channels are handling packets from the same communication.

Still further, the systems and methods described herein do not limit transmission to any one type of interface. Instead, the disclosed systems may use any number and type of multiple physical or logical interfaces (e.g., cellular, fiber, copper, virtual, etc.) to transmit packets of a single communication, so long as both endpoints can communicate via such an interface. That is, a single integral communication can be broken into packets, and subsets of those packets can be distributed for transmission over one or more different communication interfaces. Unlike a conventional stream of data, which might use a packet log, in the subject disclosure, the entirety of a data communication (or of a hop therein) is not traceable to a single source IP address and a single destination IP address. Rather, packet traffic activity for the single communication occurs concurrently via different channels (and possibly different interfaces) and/or different tunnels/networks (whether VPN or otherwise), visible to an observer only as a plurality of disparate IP addresses communicating and not as a single device requesting or sourcing data.

FIG. 1 illustrates an exemplary environment 100 in which a sequence of data packets may be forwarded from one network A to a remote network B (a network separated logically and/or physically from network A), or vice versa, via a virtual private network (VPN) tunnel. Network A (element 110) may include network devices such as a firewall 112 and a router 114, among other network appliances (not shown), interconnected via a sub-network. For purposes of explanation, network A may, in shorthand, be identified by an IP address ending in .1. Network B (element 120) may include network devices such as a firewall 122 and a router 124, among other network appliances (not shown), interconnected via a sub-network. For purposes of explanation, network B may, in shorthand, be identified by an IP address ending in .2. While these elements are shown as separate component parts in FIG. 1, in alternate embodiments, firewall 112 and router 114 may be part of a single network device and/or firewall 122 and router 124 may be part of a single network device, with different logical components. VPN tunnel 150 may pass encrypted traffic between networks A and B via one or more communication networks 130. In other embodiments, rather than a VPN, any type of intermediate tunnel and/or network whether public or private, or any number of tunnels and/or networks (including no tunnel or VPN), may separate networks A and B.

In one embodiment, when data is sent from network A to network B, each unit of data (in an exemplary embodiment, a packet) sent through VPN tunnel 150 is encrypted and encapsulated with a header that facilitates routing of the data unit from a source to a destination router. The method of encryption is not limited, and any number of known encryption algorithms may be variously used in different embodiments. When received by devices on destination network 120, the data unit is decrypted using a shared encryption key, and the data therein is transferred toward its ultimate destination. In other embodiments with no VPN, no encryption may be applied to the packet traffic sent to network 120, and no decryption may be needed.

Network 130 is, in the exemplary embodiment, any type of wired network, such as Ethernet or fiber optics, wide area network (such as the Internet), a local area network (such as an intranet), cellular network (e.g., Sprint, AT&T, or the like) or another type of wireless network, such as Wi-Fi, Bluetooth, Bluetooth Low Energy, and/or other close-range wireless communications. In various embodiments, network 130 may be any IP-enabled network, including microwave, radio, and the like. In still other embodiments, one or more of any of the above-listed network types may be used, or any combination thereof. In the exemplary embodiment, information may be communicated between system components in an encrypted format such by a transport layer security (TLS) or secure socket layer (SSL) protocol. In an exemplary embodiment, the components of the environment 100 may use the transmission control protocol/Internet protocol (TCP/IP) to facilitate communication.

FIG. 1 illustrates two secure data routing modules 140-1 and 140-2 (collectively or individually, modules 140), though any number or configuration of such modules may be used in different embodiments. Modules 140 may perform certain channel establishment and data forwarding actions as described in greater detail herein.

Figure 2:
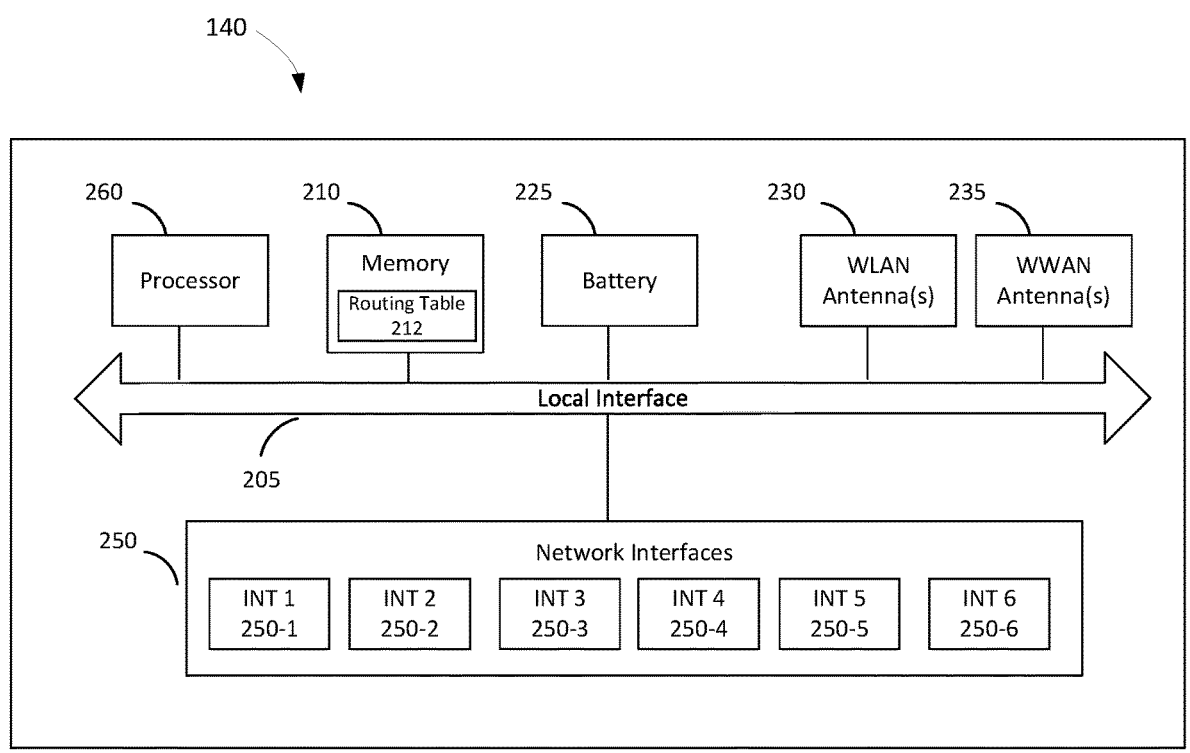
FIG. 2 depicts a block diagram of the component parts of a secure data routing module in accordance with some embodiments of the present disclosure.

FIG. 2 illustrates exemplary components of a secure data routing module 140 in accordance with some embodiments. In particular, FIG. 2 illustrates an embodiment in which a secure data routing module 140 is presented as part of a hardware device. In some embodiments, this is a dedicated device, however, in other embodiments, the functions described herein may be performed by one or more shared systems. For example, the secure data routing module 140 may be implemented in a network appliance such as a router or a physical firewall appliance. For example, in an embodiment with an open source firewall appliance, the functions of the secure data routing module 140 may be implemented in the Linux kernel.

While FIG. 2 illustrates a certain configuration of components, it can be understood that any practical configuration may be used, and the components need not fall into the particular logical groupings illustrated in FIG. 2. Further, it will be generally understood that the architectures described below and illustrated in the figures are not limited to the components discussed herein, and may include other hardware and software components. Rather, for ease of illustration, only the components and functionalities most relevant to the subject systems and methods are discussed herein. In the embodiment of FIG. 2, secure data routing module 140 may include a local communication interface 205 such as one or more buses, a processing unit 260, a memory 210, a power supply (e.g., a battery) 225, antennas 230, 235, and one or more network interface(s) 250.

Processor 260 may execute instructions stored in a corresponding memory 210 to control the module's functionalities. Processor(s) 260 may be respectively implemented by type of suitable processor and may include hardware, software, memory, and circuitry (or any combination thereof), for example, one or more of central processing units (CPU), digital signal processors (DSP), graphics processing units (GPU), application-specific integrated circuits (ASICs), field-programmable gate arrays (FPGAs), and/or microprocessors programmed with software or firmware, or other types of circuits for performing the described functionalities (described further herein), or any combination thereof. As one illustrative example, secure data routing module 140 might be made up of one or more single-board computers (SBC) with a cellular-capable dongle, an attached purposeful cellular appliance, or an accessible virtual cloud. The module 140 is therefore capable of establishing one or more communication channels with any entity with a physical or logical cellular carrier connection.

In addition to holding one of more instructions for execution by the processing unit 260, memory 210 may be used to store at least one routing table 212. Routing table 212 contains configuration information used by a module 140 to define the available routes available to the module when forwarding one or more data packets. In particular, a source module 140-1 may communicate with one or more remote destination modules 140-2 to define a plurality of available communication channels, and may update routing table 212 to specify IP address information for each of a plurality of gateways corresponding to those channels. As used herein, memory 210 may refer to any suitable storage medium such as disks, thumb drives, etc., both volatile and non-volatile. Examples of such media include RAM, ROM, EEPROM, SRAM, flash memory, or any other tangible or non-transitory medium that stores information that is accessible by a processor. Different embodiments may have different capabilities, so long as the amount of RAM is sufficient to support receiving and processing data, and running all supporting software, as described herein. In an exemplary embodiment, a flash memory may be used.

The module 140 may include a battery (or batteries) 225. As an alternate to a battery, one or more power supplies such as a physical connection to AC power or DC power (including power conversion circuitry) may be used. Battery 225 may be charged via a physical power connection, via inductive charging, or via any other suitable method. The battery may supply a variety of voltages to the components of the module 140 in accordance with the requirements of those components.

Module 140 also includes one or more of a variety of physical network interfaces 250-1 to 250-6 (collectively, 250), such as optical, copper, Wi-Fi, ethernet, or the like. Data received/transmitted via any of the interfaces 250 is processed by the processor 260. While only six physical interfaces are illustrated in FIG. 2, it will be generally understood that any number of interfaces, and/or any configuration thereof, may be possible in different embodiments. Inputs from any of WLAN antenna(s) 230 and WWAN antenna(s) 235 are received and processed by the processer 260.

In another embodiment, rather than a hardware device, a module for secure data routing between two remote systems may include a cloud-based computer system comprising one or more physical processors programmed by stored instructions. For example, the module 140 may be implemented across one or more virtual servers in a shared cloud environment. That is, the functionality of the module 140 may be distributed in whole or in part across one or more remote servers (or components thereof) or other computing resources, that is, in the cloud, whether dedicated or shared. In still other embodiments, a single enterprise may run a module 140 at each of multiple remote endpoints connected by a private WAN.

As will be described in detail below, secure data routing module 140 may perform certain VPN tunnel establishment and data unit forwarding actions. Module 140 may, in some embodiments, perform these actions in response to processor 260 executing software instructions variously implemented in software, hardware, firmware or any combination thereof. In the exemplary configuration shown in FIG. 2, these various logics are variously implemented in software and are stored in memory 210. Note that these components, when implemented in software, can be stored and transported on any non-transitory computer-readable medium for use by or in connection with an apparatus (e.g., a microprocessor) that can execute instructions. In the context of this disclosure, a "computer-readable medium" can be any device or system that can contain or store a computer program for use by or in connection with an instruction execution apparatus. A computer-readable medium may be defined as one or more physical or logical memory devices and/or carrier waves.

In some embodiments, the specific algorithms or instructions configured to perform the functions of the secure data routing module 140 described herein are not executed locally to the module 140, but rather, may be provided to the module 140 for execution through the use of one or more software development kits, which may include, e.g., one or more application programming interfaces (APIs), web APIs, tools to communicate with embedded systems, or any other appropriate implementation. In one embodiment, module 140 may be controlled via a series of user interfaces delivered to one or more users/entities to allow targeted or individual control of network traffic configuration.

With reference to FIG. 1, the secure data routing module 140 functions to scatter units of data (e.g., packets) across multiple network connections. In the exemplary embodiment, module 140 may establish multiple route paths between a source computing system and a destination computing system. In an exemplary embodiment, the route paths are secured, tunneled network route paths through which traffic is encrypted by at least one complex encryption algorithm, though other embodiments may transmit or receive unencrypted information. In the illustrated embodiment, one VPN tunnel 150 has several routes therein, however, in other embodiments, multiple tunnels (whether VPN or other, encrypted or unencrypted, or any combination thereof) may be configured, each with one or more respective routes, such as that data may be sent via multiple route paths across and between multiple tunnels. Module 140 may also manage addressing schemas that assign anonymous, non-attributed IP addresses to each local endpoint of the network route paths. Upon receipt of a packet for transmission from the source computing system, secure data routing module 140 assigns a random network routing path to the packet, and transmit the packet across that path.

In one embodiment, secure data routing module 140-1 establishes a plurality of data channels (also referred to herein as "channels" or "communication channels") between source computer network 110 and a secure data routing module 140-2 at a remote destination computer network 120. A data channel may be understood as any established connection between two remote computer systems. The establishment or opening of such a connection may involve one or more administrative messages sent between the two computer systems, e.g., the systems acknowledge each other and are prepared to send and/or receive data while connected. Each source and target of the respective channels is assigned a respective IP address (in some embodiments, a temporary IP address). Accordingly, a particular transmission over a channel is recognizable by the channel endpoints, and not by the ultimate intended endpoints of the transmission itself.

A corresponding secure data routing module 140-2 serving as an entry point to network 120 housing the destination endpoint, receives each of the packets transmitted to it via one or more channels between the source network 110 and the destination network 120. In the exemplary embodiment, module 140-2 accepts packets over any IP address equally as if they came from the same sender. That is, flexible routing paths can be used, where module 140-2 is familiar with the IP addresses of the established connections, and is agnostic as to the transmission source, as long as it is from one of those established channels. The destination module 140 may be configured to collect the packets from each of the multiple channels and, from the resulting aggregated collection, reconstruct the original communication. The destination module 140 may then transfer the complete reconstructed communication to the intended endpoint recipient.

In the TCP/IP protocol, a node (or host) communicating over a public network is assigned a unique network address with which to identify themselves, commonly understood as an IP address. Within any one or more possible physical or logical communication interfaces shared between the transmission endpoints (e.g., a cellular network, ethernet, fiber cable, HAM radio, etc.), a secure data routing module 140 acts to create multiple different communication channels, each identified with unique IP addresses at each endpoint. For ease of reference, the representative IP addresses herein will be referred to by shorthand notation, e.g., .1 rather than X.X.X.1, and so on.

As shown in FIG. 1, four host IP addresses, numbered as .5, .6, .7, and .8, have been generated at and by the source module 140-1 and four IP addresses, numbered as .9, .10, .11, and .12 have been generated at and by the destination module 140-2. Any combination of (source, destination) endpoints may be used as a channel Therefore, in the embodiment of FIG. 1, 16 potential channels for routing packets (illustrated by solid lines) are available within the existing VPN tunnel 150 (illustrated with dotted lines). These packets are encrypted and decrypted in tunnel 150. While VPN provides the benefit of encryption, the activities performed by module 140 are not limited to a VPN configuration. The establishment of the channels can be performed on any interface that can handle TCP/IP traffic.

In the exemplary embodiment, a secure data routing module 140 is installed at each entry/exit point of communication to a network A, B, that each, at each intersection where outgoing communication may occur. As illustrated, one secure data routing module 140-1 is configured on channels .5, .6, .7, .8, and another secure data routing module 140-2 is configured to communicate on channels .9, .10, .11, and .12, each connecting through an ISP to the Internet, though other networks or combination of networks may be used in other embodiments.

In the illustrated embodiments, if secure data routing module 140-1 wishes to communicate with network B, it may do so through any of the 16 created channels, that is, any one of channels .5 to .8 in combination with any one of channels .9 to .13 (e.g., .5 to .9, .5 to .10, .6 to .9, .6 to .10, etc.). Rather than a single gateway which transfers packets through the VPN, the exemplary module 140-1 creates 16 default routes over which to forward data. The creation (and later, dismantling) of a channel may be done in any known way. The communication from module 140-1 to module 140-2 includes transmission of a plurality of packets. At the time each packet is sent, one of these 16 channels is randomly selected, such that a given packet travels down an unpredictable one or any of the 16 paths.

Module 140-1 can pick (e.g., randomly) any established channel when sending a packet. More particularly, the transmission of a communication with multiple packets can be split up so as to leverage multiple channels (multiple transmission routes), each randomly selected. By these means, secure data routing module 140 intentionally creates many changing paths, not by adding network circuits, but by creating and pulling down channels at its discretion to create different paths for communication. Even if there is overlap of transmission over one or multiple paths, because randomization is applied on a per packet basis, the entirety of any multi-packet communication will not be sent down a single channel. Accordingly, an observer of any single path will not be privy to the entirety of the transmitted packets.

Alternate embodiments may exist where any number of VPN tunnels 150 and/or unencrypted tunnels (or any combination thereof) may be used or configured, each with a respective set of channels with assigned IP addresses for the channel endpoints. The transmission of a communication with multiple packets can be split up so as to leverage the different channels, across the different tunnels, each packet being assigned a random path. A first packet from a communication may be sent via a first channel of a first VPN tunnel 150, while a second packet from the same communication may be sent via a first channel of a different (VPN or non-VPN tunnel), and both the first and second packets may be received and combined at the module 140-2.

Figure 3A:
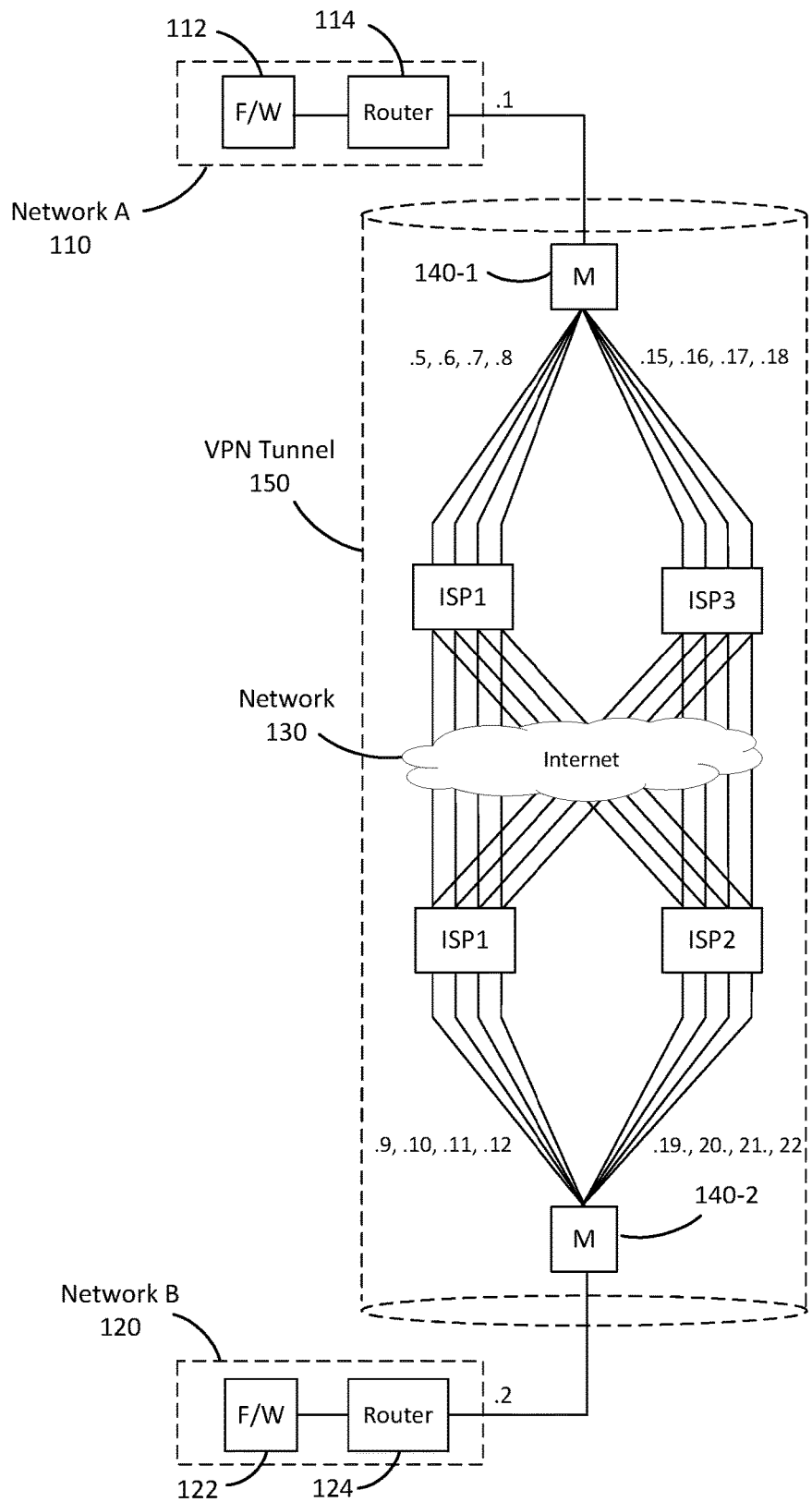
FIG. 3A depicts a diagram of a system for secure data transmission in accordance with some embodiments of the present disclosure.

The number of channels established by a single module 140 is not subject to any practicable ceiling, and may vary in different embodiments. While FIG. 1 illustrates that a single module 140 creates four IP addresses for a single physical network interface, thereby establishing 16 potential channels, such is simply an exemplary number for ease or illustration, and other embodiments may have any number of channels. Further, where both endpoints of the communication have multiple complementary physical or logical interfaces, different sets of channels may be established over each of multiple different interfaces, and packet transmission may be spread out over various channels over those different interfaces where appropriate. For instance, FIG. 3A illustrates an embodiment similar to FIG. 1, in which when network A is sending data to network B, network A may communicate via either of ISP1 or ISP3, and network B may communicate via either of ISP1 or ISP2. In this embodiment, modules 140-1 and 140-2 may create a set of channels for each of the two disparate ISPs. In FIG. 3A, module 140-1 transmits and receives on channels .5 to .8 for ISP1 and .15 to .18 for ISP3, and module 140-2 transmits and receives on channels .9 to .12 for ISP1 and .19 to .22 for ISP2. Module 140-1 may therefore send data from any of .5 to .8 or .15 to .18 to any of .9 to .12 or .19 to .22, regardless the number or configuration of networks, providing 64 possible channels between the two modules.

Figure 3B:
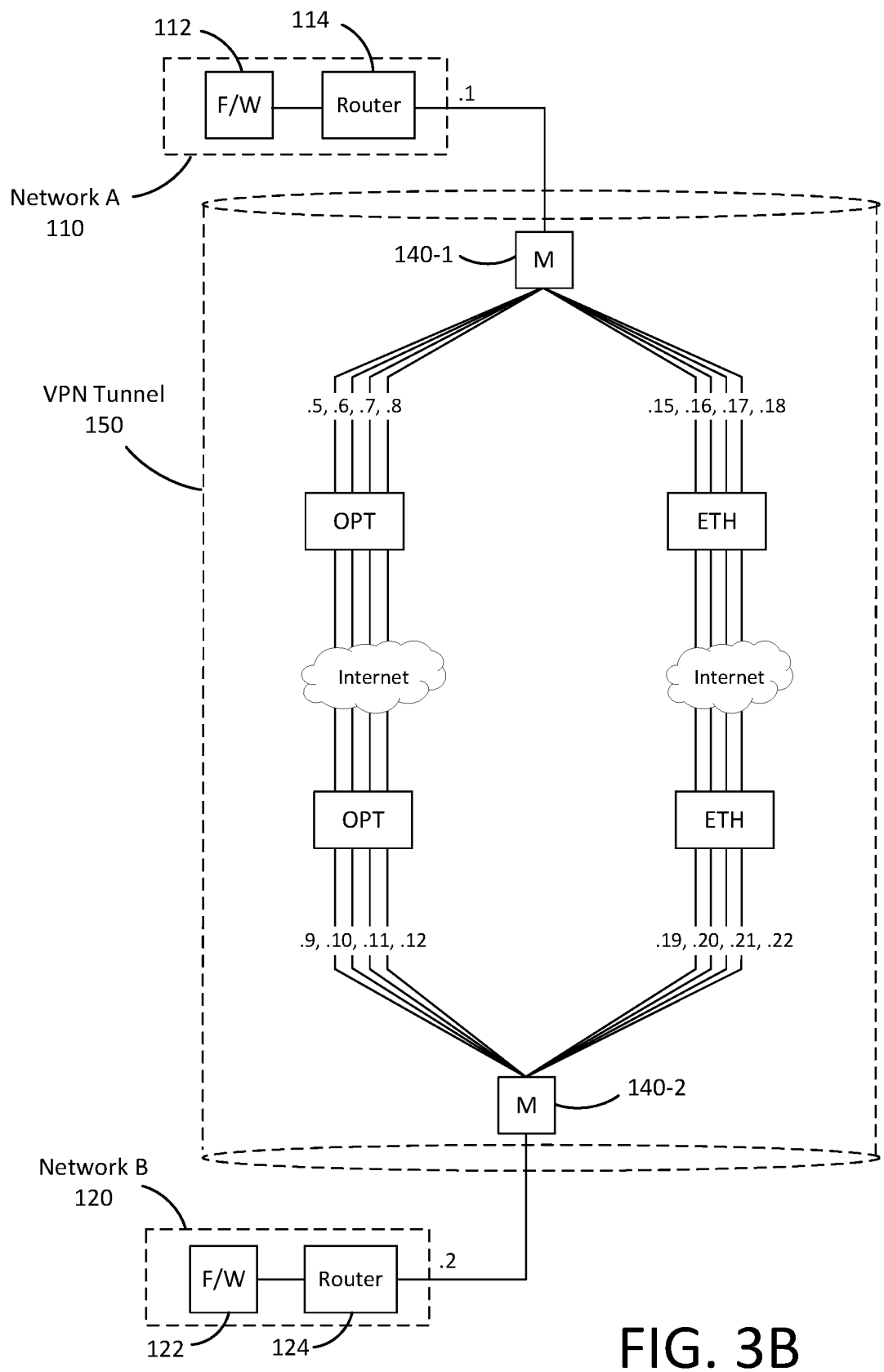
FIG. 3B depicts a diagram of a system for secure data transmission in accordance with some embodiments of the present disclosure.

FIG. 3B illustrates a similar embodiment, in which the routing appliances for both network A 110 and network B 120 have both optical and Ethernet interfaces. In this embodiment, modules 140-1 and 140-2 may create a set of channels for each of the two disparate interfaces. In FIG. 3B, module 140-1 transmits and receives from channel endpoints .5 to .8 over optical fiber and from channel endpoints .15 to .18 over Ethernet and module 140-2 transmits and receives from channel endpoints .9 to .12 over optical cables and on channel endpoints .19 to .22 over Ethernet. Module 140-1 may therefore send data from any of .5 to .8 to any of .9 to .12 or from any of .15 to .18 to any of .19 to .22, regardless of the number or configuration of networks. There are therefore 16 possible channels over each interface, and therefore any given packet may be sent between the two modules over any of 32 possible channels. In another embodiment (not shown), the endpoints may be configured for communication via one or more fiber channels, where multiple channels are configured to transmit to a repeater. It can therefore be understood that the secure data transmission modules 140 are independent over hardware, so long as the available interfaces are configured to communicate via TCP/IP.

Figure 4:
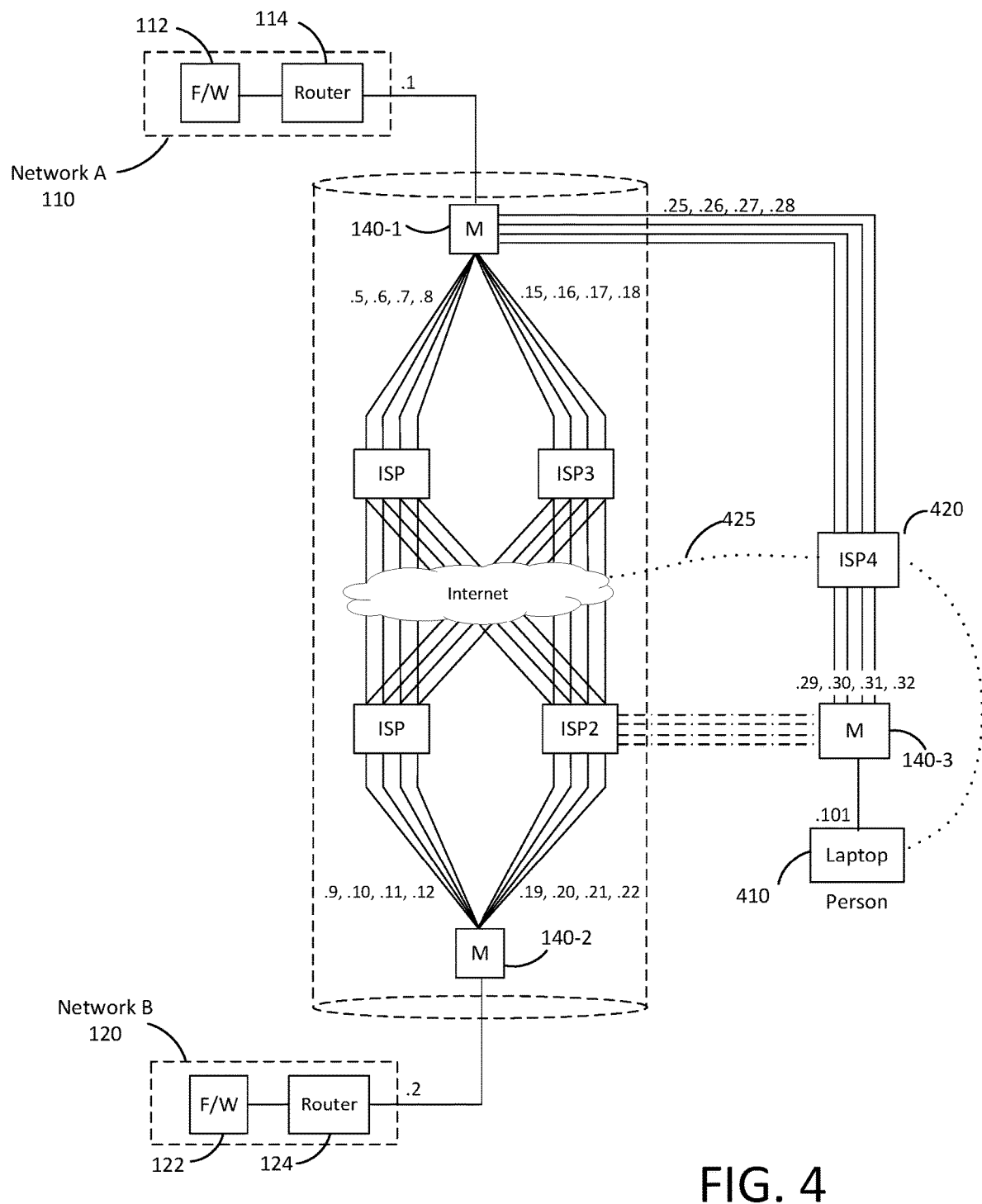
FIG. 4 depicts a diagram of a system for secure data transmission in accordance with some embodiments of the present disclosure.

In another embodiment, illustrated in FIG. 4, a user device 410 identified by an IP address of .101, e.g., a laptop or other device of an authorized user on network A, may wish to use a secure data routing module 140-3 to send data to network B, scattering the transmitted and received data packets across different channels for security purposes. Secure data routing module 140-3 may be, for instance, a dongle or another device capable of performing the same functions as the exemplary module illustrated in FIG. 2. The module 140-3, communicatively coupled to the laptop 410, creates new channels of communication (with exemplary endpoint IP addresses .29, .30, .31, .32) which are used for communication between laptop and a network B, the destination IP addresses for that network being .19, .20, .21, and .22, as previously established by module 140-2. Of course, such IP addresses are merely for purposes of example, and any number or type or identifiers for the channel endpoints may be used by modules 140 in different embodiments. By these means, the user of device 410 may use the module 140-3 to get a broader diversity of IP pools.

In another exemplary situation, a user with a device 410 may wish to connect to a resource on network A (e.g., a mail server, file server, some protected resource, or the like). Device 410 may be a laptop with a cellular modem that facilitates a connection with an ISP 420, such connection illustrated in FIG. 4 as a dotted line. In a conventional solution, device 410 may then connect to the internet (dotted line 425), a proxy server, or the like. In one embodiment of a system described herein, secure data routing module 140-3 may be a dedicated portable device (e.g., a dongle or other dedicated hardware), an appliance for the device 410 (e.g., a modem card), or a virtual server connected to laptop 410. Module 140-3 creates new channels of communication using IP addresses (e.g., .29, .30, .31, .32) different to the IP address assigned to the device. When the user of the device 410 accesses its mail client and pulls mail from network A, an observer of traffic sent over ISP4 420 will not see continuous communication between IP .101 (laptop 410) and IP .1 (network 110), but rather, will see a series of transmissions over multiple source IP addresses .29, .30, .31, .32, with no indication that the data is requested or served by the same entity. Similarly, as illustrated, transmission from device 410 to an endpoint on network B (120) might travel between module 140-3 and module 140-2 via ISP2, creating 16 potential channels for routing between host IPs .29 to .32 and destination IPs .19 to .22. The expansion of available IP addresses for transmission is invisible to the functioning of the device 410, as all of the functioning of the module 140-3 is occurring upon egress of the data packets. In some embodiments, a different user with a second device 430 (not shown) could use an attached module 140-4 (not shown), such as, e.g., a dongle or other dedicated hardware, a modem card, or virtual server, to configure four (or any number) of channels. The channels created by the module 140-4 and their IP addresses would be different and separate from the four channels configured by module 140-*s* used by device 410.

Figure 5A:
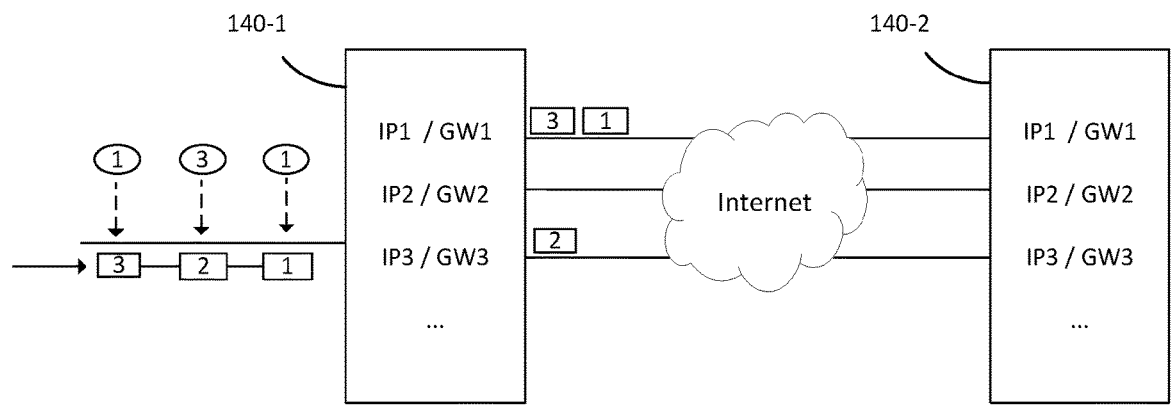
FIGS. 5A and 5B illustrate packet level data transmission in accordance with some embodiments of the present disclosure.

In an exemplary embodiment, the configuration of the routing tables is done through the configuration of one or more rulesets at a module 140 that direct and control TCP/IP network traffic. In an exemplary embodiment, a configuration utility program such as iptables is used to configure such rulesets (e.g., within a Linux kernel firewall), however other embodiments may use other utilities or programs. In such embodiments, traffic from an endpoint within a source network is transmitted to a logical gateway for forwarding. Modern routers provide the ability to transmit information from multiple IPs and multiple gateways. With reference to FIG. 5A, three logical gateways are illustrated (GW1, GW2, GW3).

Conventionally, decisions about which gateway to use for data transmission may depend on factors such as cost or performance. For instance, to optimize overall network performance, an urgent packet may be directed to a high speed link, while larger files or attachments may be directed to other links. In one exemplary embodiment of the systems and methods described herein, the secure data routing module 140 sets (e.g., using iptables) a flag (or in other embodiments, other types of marks or metadata) on each packet. The range of available flags can be understood to correspond to the range of available channels for transmission. For instance, with reference to FIG. 1, 16 possible encrypted channels are available through VPN 150, and therefore, one of 16 possible flags is set on that packet. The flag is then used to determine which gateway should be used when that packet egresses the network 110. In some embodiments, the flag may be a numerical value (e.g., binary, base 10, hexadecimal, and the like) corresponding to a channel, however, any appropriate flag with a minimal/insignificant amount of data may be used in other embodiments. In some embodiments, the flag may be a NIC, a character string, IP address, or other information relevant to identifying an outgoing gateway.

In some embodiments, the selection of the packet flag is randomized. For instance, a random number generator may be used to generate a number with a ceiling equal to the number of established available channels. This random number may be determined on a packet-by-packet basis, and the random number output may be used in correspondence with a flag or mark to be placed on the packet. By these means, no default gateway is used for packet traffic, and every potential gateway is treated or prioritized equally. Because selection of the gateways is randomized, it would therefore be expected that a relatively equal utilization of different gateways is achieved so as to more or less equitably distribute packet traffic across the multiple channels, though any utilization of gateways may occur.

In some embodiments, module 140 is aware of the general health of each of the established channels, and accordingly, the reliability or availability of each channel. In a case where one or more generated channels is down or otherwise unavailable, module 140 may either create a new channel (or more than one as necessary) or may reduce the range of available flags.

In FIG. 5A, packets 1, 2, and 3 are received from network 110. Each of incoming packets 1, 2, and 3 has been assigned a flag (here, 1, 3, 1 respectively), and each packet has been forwarded to the appropriate gateway. In some embodiments (not specifically shown), the order of the packets may be randomized before transmission out of the module 140-1, such that instead of packet 1 being transmitted before packet 3, packet 3 may be earlier transmitted. In some possible embodiments, because the packet order is unnatural, the packets cannot be reconciled into an incremental stream though they can be reconstructed by the receiving module 140-2. As one illustrative example, Voice over Internet Protocol (VoIP) packets may be mixed with Simple Mail Transfer Protocol (SMTP) packets, such that no cohesive stream of one type of data is sent.

When transmitting a marked packet, module 140-1 determines which channel the mark corresponds to, and forwards the packet to the gateway associated with the host IP address for that channel. The implementation of this process is invisible to the functioning of the source network 110. That is, rather than sending packets from the router 114 to an ISP, the packets go to the intermediate module 140-1, which functions as a forwarding device. The flag, set by the module 140-1, is not transmitted with the packet and is removed so that no lasting modification is made to the egressing packet.

In one exemplary embodiment, no processing is done to a packet within module 140-1 other than the marking and de-marking of the packet. The overhead involved therefore just involves a single random number generation, and any relevant switching cost, which tasks are insignificant in terms of resource consumption, and therefore do not add significantly to transmission latency.

In some embodiments, module 140-1 may also determine, for each incoming packet, whether the packet has been received from a trusted source within the network 110, for example, from a set of authorized devices, by login or authentication, or by any other security mechanism. If the packet is from a trusted source, the processing may continue as normal. If the packet is not from a trusted source, the packet may be dropped, quarantined, or otherwise handled in consensus with network management standards.

In some embodiments, module 140-1 may drop or reject an unmarked packet as being anomalous. In other embodiments, administrative packets may be unmarked or differently marked than data packets, so as to control network administration tasks separately from other packet switched traffic. Secure data routing module 140-1 does not alter, modify, or remove any metadata or wrappers applied to the incoming packets by other networked devices such as firewall 114. As a result, the secure data routing modules 140 are agnostic to any network administration tasks that may otherwise be implemented by the source network.

In an alternate embodiment, module 140-1 may be capable of, for one or more trusted sources, prioritizing or deprioritizing packets, e.g., by moving packets to the front of the queue or setting a header bit, or directing such traffic to a subset of available channels. For instance, in one embodiment, multiple trusted sources may provide data to module 140-1 for transmission (e.g., when some or all functionalities of module 140-1 are implemented in a cloud-based environment), and one of the trusted sources is determined to have traffic subject to a heightened standard, e.g., priority data (e.g., network administrative data), classified or confidential data, data subject to higher service standards/quality of service, or data subject to other such concerns, the module 140-1 may implement, via its processor 160, one or more logics that recognizes source IP, prioritizes packets therefrom, moves such packets to (and/or to the front of) a selected queue, directs such packets to particular gateways, and/or takes any other relevant action. Of course, the foregoing is merely exemplary and any such processing may be done in other embodiments. Such additional processing may be done in, in some embodiments, regardless of and in addition to random channel assignments for packets received from other of the trusted sources.

In an alternate embodiment, module 140-1 may be capable of dynamically adjusting one or more packet parameters in order to influence gateway selection. For exemplary purposes, a subset of gateways may be directed to channels which different communication speeds. A first carrier ISP1 may be able to handle faster speeds, while a second carrier ISP2 may be limited to slower transmission, such that they have different latencies and transmission time. By directing transmission of certain packets to certain gateways, module 140-1 may influence packets to arrive at module 140-2 out of order, thereby complicating the information observed by an eavesdropper.

Figure 5B:
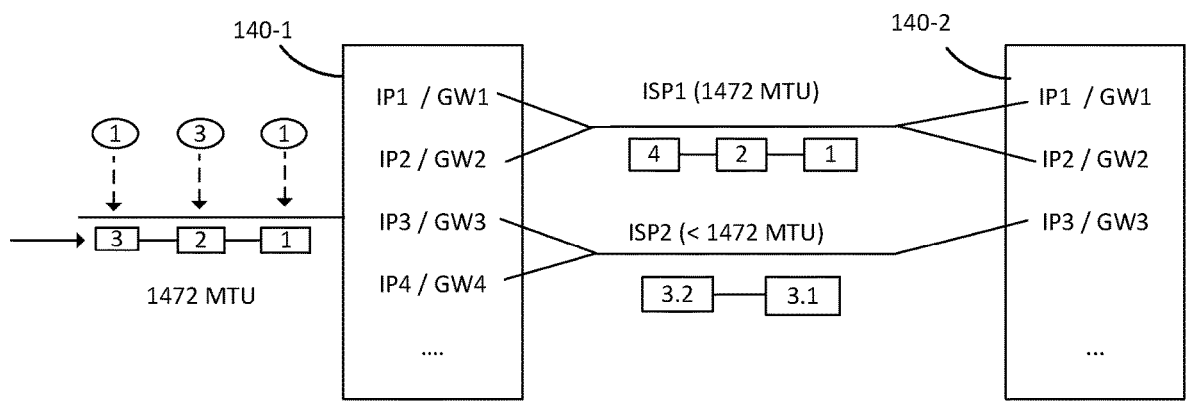

In another embodiment, with reference to FIG. 5B, module 140-1 may adjust one or more parameters of the incoming packets to modify or alter the number of outgoing packets. For example, module 140-1 may alter the maximum size of each packet (maximum transmittal unit MTU) on a gateway by gateway basis (or, in some embodiments, at the physical layer). As one example, if packets 1, 2, 3, and 4 have an MTU of 1472, the module 140-1 may reduce the MTU for the gateways for ISP to a lower amount (e.g., 900), such that packets initially sized at 1472 would have to be reduced in size and split across multiple packets. Such a split is illustrated in FIG. 5B, in which packet 3 has been split into outgoing packets 3.1 and 3.2, which can also be understood as sub-packets. These sub-packets may be reassembled by the destination module 140-2. However, because an additional packet was transmitted over the intermediate public networks, a malicious observer attempting to count/checksum packets would not be able to successfully do so.

In yet another embodiment, secure data routing modules 140 may, upon establishing the one or more connections, agree to alter the ports of the received data packets to disguise the transmitted packet type. As one example, module 140-1, having coordinated in advance with destination module 140-2, may agree to transmit IPsec packet traffic to a web server port 80, and for such alternately routed packets to be handled by the destination module 140-2 as web traffic, viz., the modules 140 may engage in 'data camouflaging' to further obscure transmitted data from an observer, that is, disguising characteristics of packet data such that eavesdroppers obtain incorrect or misleading information upon their inspection of a packet. Because such changes are handled solely between the source and destination modules 140, the modifications are invisible to the other networked devices and/or to an observer of the intermediate communication channels.

In some embodiments, secure data routing modules 140 may periodically rotate, or renumber, the IP addresses used to establish the communication channels. This may be done, in some embodiments, at scheduled times (e.g., after the elapse of a certain period of time or in course with an administrative or industry requirement), upon the occurrence of an event (such as the recognition of an unauthorized actor or a breach of security, or a physical interface failure), ad hoc upon request, or at any other appropriate time. In one embodiment, channels may be so renumbered after the completion of transmission of a particular communication, or, in some embodiments, of any communication (that is, the channels live only as long as it takes to complete a single multi-packet transmission). Re-numbering the IP address involves taking down one or more communication channels, and creating a new channel with one or more differently-numbered IP addresses. Because this may be done serially, existing communication channels continue to function even as channels are taken down. As long as module 140 has access to one physical interface, multiple communication channels can still be created. By rotating IP addresses, an eavesdropper previously able to observe information on a certain channel will be thwarted from further observation on that same channel.

Figure 6:
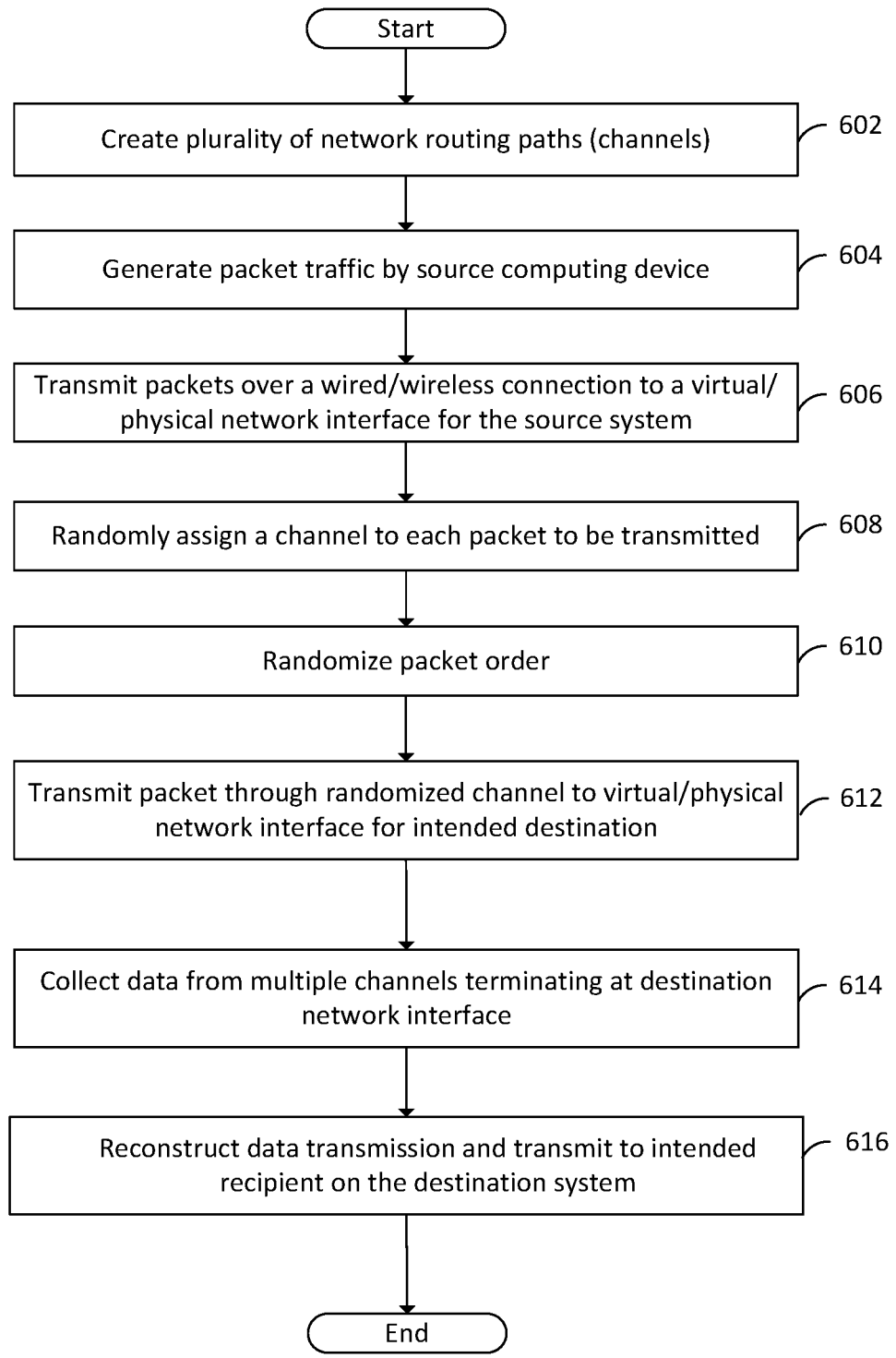
FIG. 6 is a flow chart of a secure data transmission process in accordance with some embodiments of the present disclosure.

FIG. 6 illustrates a flow chart of an exemplary process of transmitting data between two remote secure data routing modules 140. Initially, the process begins in Step 602, in which the modules 140 generate a plurality of network routing paths (channels) therebetween. Multiple channels may be created for each respective interface, or entity (e.g., different ISPs may each be used by a plurality of channels). These channels are created by agreement between the modules, so both modules are familiar with the range of trustable IP addresses from which it may receive TCP/IP communication. Step 602 may also involve the update of one or more routing tables 212 to add any newly created transmission paths and remove any destroyed or unavailable paths. The IP addresses of each host are created for purposes of the modules 140, and are not identical to (or in some embodiments, even related to or associated with) the actual IP addresses of the ultimate communication endpoints. Accordingly, the packet traffic generated by a source (client) computing device in Step 604 cannot be attributed to either of those endpoints. In Step 606, the data packets are transmitted over a wired/wireless connection to a virtual/physical network interface for the source system. Each one of those packets is randomly assigned, in Step 608, to a communication channel (established in Step 602) through which it will be transferred. This assignment is typically done by marking the packet, or setting a flag, such mark only being used by a source module 140-1. In some embodiments, in Step 610, the packet order may be randomized for transmission, though in some embodiments, this step may be skipped. In Step 612, each packet is transmitted (serially with respect to those transferred over a single interface and/or concurrently with respect to multiple interfaces) via one or more public networks on the path defined by the randomized channel assignment. That is, the secure data routing module 140-1 may refer to its stored routing table 212 to determine which outgoing gateway is associated with the packet marking/flag. The packet is sent to the virtual/physical network interface for its intended destination. In Step 614, the destination secure data routing module 140-2 collects the packet data from the multiple channel destinations that terminated at the destination network interface. The process ends in In Step 616, in which module 140-2 reconstructs the data transmission from the received packets and forwards the communication to the intended recipient at the ultimate communication endpoint.

Figure 7:
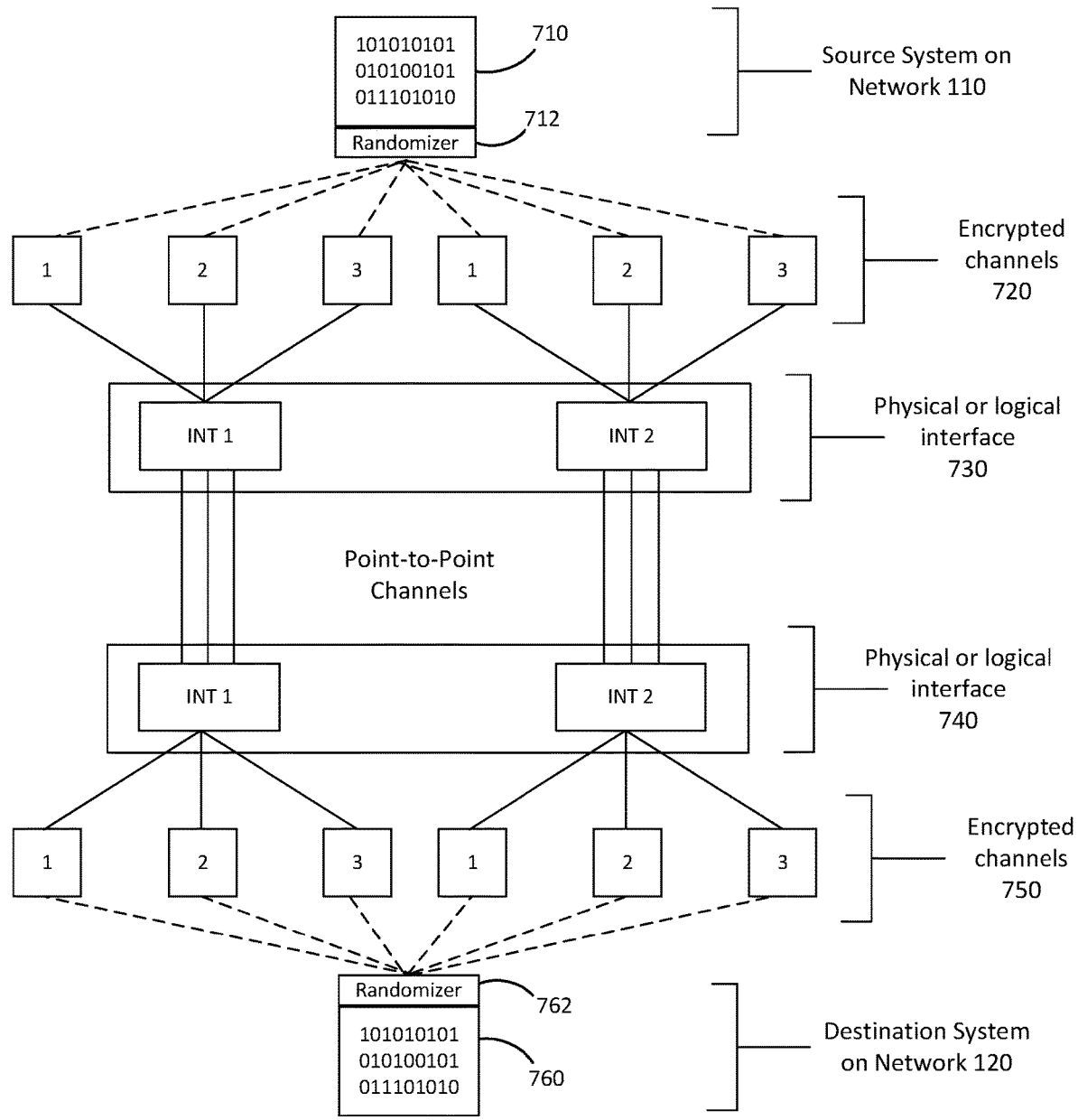
FIG. 7 depicts a diagram of communication between endpoints on two networks in accordance with some embodiments of the present disclosure.

FIG. 7 illustrates an exemplary data flow between endpoints 110, 120 over the systems and methods described herein where more than one network interface is available. Client generated data 710, 760 to be transmitted is randomized, on a packet by packet basis, by randomizer 712, 762 (in a secure data routing module 140), which may randomize a packet order and/or randomly assign a channel for a packet to be routed upon. A plurality (here, 3) encrypted channels 720, 750 are established for each interface. A packet of data 710 is sent along its assigned channel 720 via one of a plurality (here, 2) physical or logical interfaces 730, 740 (for example, Wi-Fi, Ethernet/copper cabling, fiber optic cabling, or any appropriate medium). The data packet is sent along any one of the established point-to-point channels until reaching its destination secure data routing module, at which point the received data packets are reconstructed into the original data 710, 760 and forwarded, within network 110, 120, to a final destination.

Figure 8:
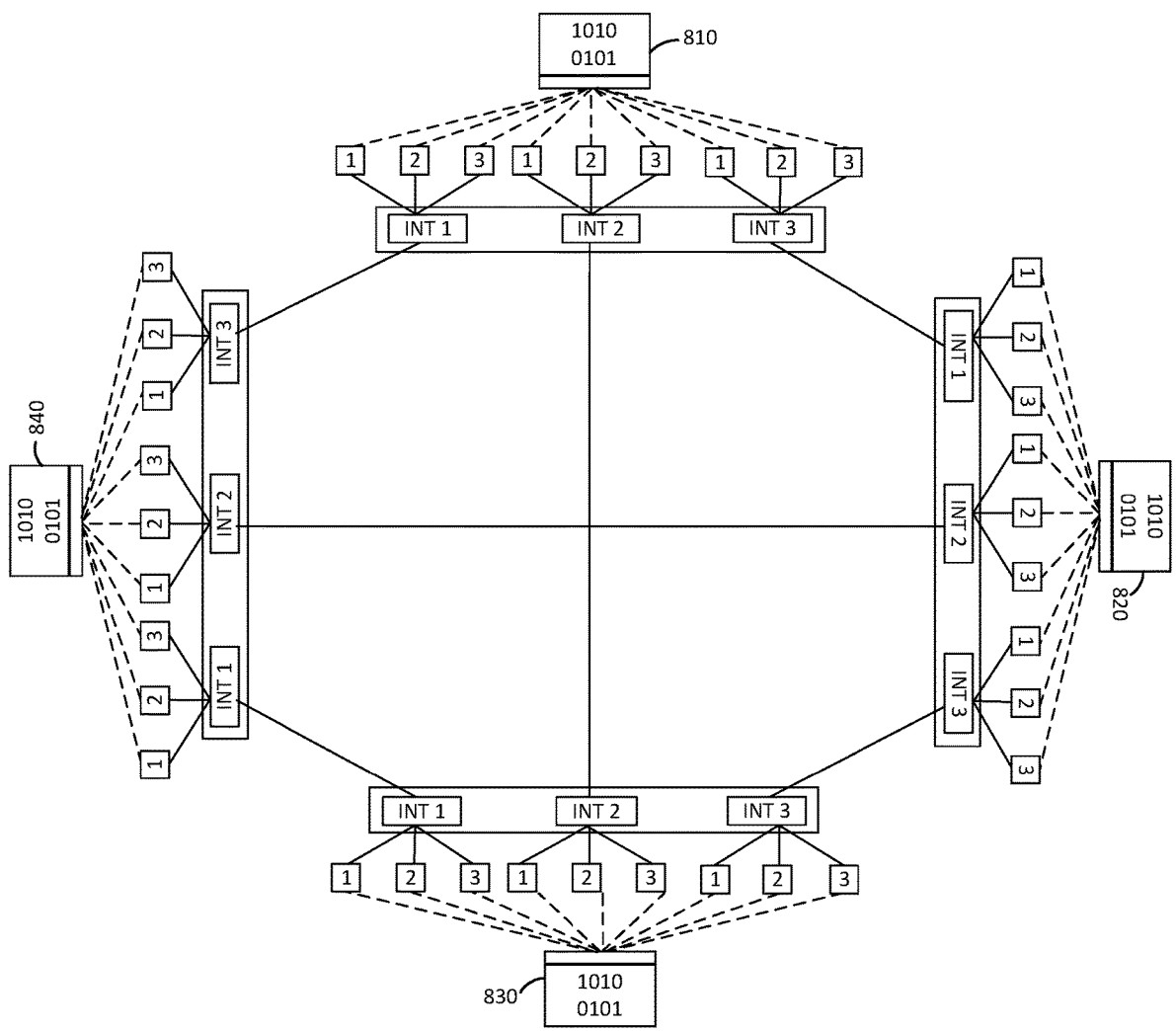
FIG. 8 depicts a diagram of communication between endpoints on multiple networks with a mesh configuration, in accordance with some embodiments of the present disclosure.

FIG. 8 illustrates an embodiment where endpoint data flows between multiple endpoint nodes 810, 820, 830, 840 in a mesh configuration. That is, in this embodiment, more than two networks may be considered. While four network endpoints are shown, other embodiments may exist where any number of networks are communicable in a mesh configuration. Each endpoint node 810-840 contains multiple physical network connections and multiple physical route paths, through which multiple secure channels can be configured. If one or more physical network connections were to fail, the routes would choose an alternate path through the mesh configuration.

Unlike conventional solutions, which tend towards reducing complexity of network architecture to allow for closer monitoring of networked devices, the systems and methods described herein add complexity, creating multiple instances of virtual channels and IPs. However, the added complexity is mitigated by the management of that information entirely within the secure data routing devices 140, such that the information at the ultimate endpoints retains its existing configuration. Further, in conventional solutions, if a planned network traffic route is compromised, the entirety of the transmission thereon can be overhead and reconstituted. However, in the systems and methods described herein, even if one generated channel is comprised, the amount of exposed information is only partial. Therefore, even if the applicable encryption cipher is cracked, the eavesdropper's checksum will not have the whole network picture, and the network keys will not be able to unroll the observed data into readable communication.

Still further, in some embodiments, a compromised channel can be easily changed (brought down and replaced), resetting the eavesdropper's efforts at knowing relevant communication paths. Further, data can continue to be transmitted over other channels associated with the interface, even when one channel is compromised, ensuring high reliability of data. Accordingly, the system is highly robust and scalable, the number of potential communication channels being limited only by the number of network interfaces and the available computing resources.

Further, the solution is agnostic of the encryption technology and/or keys used by either of the endpoint networks in establishing a VPN tunnel. That is, regardless of the level of security provided by encryption, the disparate transmittal of data over several channels limits the amount of data a malicious eavesdropper can obtain. Therefore, even a knowledgeable malicious actor would not be able to exploit known encryption keys, as he would not have access to the entirety of the data.

By virtue of the methods and systems described herein, a mechanism for encryption is created that is wholly isolated from the source system of data transmission. Because of this, even when that system has been compromised, for example by a knowledgeable bad actor or snooper (e.g., a former employee or hacker), it is still difficult for the knowledgeable actor to observe and/or reproduce the entirety of traffic transmitted from the compromised system. That is, the systems and methods described herein can be used to mitigate the security shortfalls caused by compromised routers, or VPN failures.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A network device comprising:
   a memory configured to store a data routing table; and
   one or more processing units configured to execute instructions stored in the one or more memories to perform steps comprising:
   (a) establishing, within a virtual private network (VPN) tunnel to a destination, a plurality of logical communication channels;
   (b) receiving, from a trusted source, a plurality of data packets;
   (c) randomly selecting, for each data packet of the plurality of data packets, a value from a set of possible values, the number of possible values in the set being equal to the number of established logical communication channels in the plurality of logical communication channels;
   (d) assigning, to each data packet of the plurality of data packets, metadata corresponding to the randomly selected value;
   (e) selecting, for each data packet of the plurality of data packets, based on the assigned metadata, a logical communication channel for egress; and
   (f) transmitting each of the plurality of data packets to the destination via the selected logical communication channel.

2. The network device of claim 1, wherein the network device is assigned a first IP address, and
   wherein each of the plurality of logical communication channels is associated with an IP address different than the first IP address.

3. The network device of claim 1, wherein each of the network device and a second network device located at the destination are configured with both of a first physical interface and a second physical interface, and
   wherein the network device establishes, for the first physical interface, a first plurality of logical communication channels, and establishes, for the second physical interface, a second plurality of logical communication channels.

4. The network device of claim 1, wherein the assigned metadata corresponding to the randomly selected value is a bit set in the packet header.

5. The network device of claim 1, wherein the one or more processing units are further configured to execute instructions stored in the one or more memories to perform steps comprising:
   (a) removing, based on the occurrence of an event, a first channel of the plurality of logical communication channels, the first channel having a first IP address, and
   (b) establishing a second logical communication channel that is not part of the plurality of logical communication channels, the second logical communication channel having a different IP address than the first IP address.

6. The network device of claim 5, wherein the event is one of: a security event, an administrative event, or a transmission event, and
   wherein the transmission event is the successful transmission of a plurality of related packets to the destination.

7. The network device of claim 1, wherein the data routing table stores, in association with each of the set of possible values, information sufficient to identify a logical communication channel of the plurality of logical communication channels.

8. An apparatus operatively coupled to a private network and one or more public networks, the apparatus comprising:
   one or more network communication interfaces, and
   a processor configured to perform steps comprising:
   (a) establishing, for each of the one or more network communication interfaces, a plurality of logical communication channels to a remote private network, each logical communication channel corresponding to a unique transmission route between the private network and the remote private network via the one or more public networks;
   (b) receiving a plurality of data packets;
   (c) randomly selecting, for each data packet of the plurality of data packets, a value from a set of possible values, the number of possible values in the set being equal to the number of established logical communication channels in the plurality of logical communication channels;
   (d) assigning, to each data packet of the plurality of data packets, metadata corresponding to the randomly selected value;
   (e) selecting, for each data packet of the plurality of data packets, based on the assigned metadata, a logical communication channel for egress; and
   (f) transmitting each of the plurality of data packets to the destination via the selected logical communication channel.

9. The apparatus of claim 8, wherein the private network is associated with a first IP address, and
   wherein each of the plurality of logical communication channels is associated with an IP address different than the first IP address.

10. The apparatus of claim 8, wherein each of the plurality of data packets is encrypted within a virtual private network prior to transmission.

11. The apparatus of claim 8, wherein the processor is further configured to perform steps comprising:
    (a) removing, based on the occurrence of an event, a first channel of the plurality of logical communication channels, the first channel having a first IP address, and
    (b) establishing a second logical communication channel that is not part of the plurality of logical communication channels, the second logical communication channel having a different IP address than the first IP address.

12. The apparatus of claim 11, wherein the event is one of: a security event, an administrative event, or a data transmission event.

13. A method comprising:
    establishing, by a device coupled to a first network, within a virtual private network (VPN) tunnel, a plurality of logical communication channels between the device coupled to a first network and a device coupled to a second network remote from the first network, each logical communication channel corresponding to a unique data transmission route between the first network and the second private network;
    (b) receiving, by the device coupled to the first network, a plurality of data packets;
    (c) randomly selecting, for each data packet of the plurality of data packets, a value from a set of possible values, the number of possible values in the set being equal to the number of established logical communication channels in the plurality of logical communication channels;
    (d) assigning, by the device coupled to the first network, to each data packet of the plurality of data packets, metadata corresponding to the randomly selected value;

(e) selecting, for each data packet of the plurality of data packets, based on the assigned metadata, a logical communication channel for egress; and (f) transmitting, by the device coupled to the first network, each of the plurality of data packets to the device coupled to the second network, via the selected logical communication channel.

14. The method of claim 13, wherein the first network is associated with a first IP address, and wherein each of the plurality of logical communication channels is associated with an IP address different than the first IP address.

15. The method of claim 13, further comprising:

(a) removing, by the device coupled to the first network, based on the occurrence of an event, a first channel of the plurality of logical communication channels, the first channel having a first IP address, and (b) establishing, by the device coupled to the first network, a second logical communication channel that is not part of the plurality of logical communication channels, the second logical communication channel having a different IP address than the first IP address.

16. The method of claim 13, wherein packet data is transmitted concurrently over each of the plurality of logical communication channels.

* * * * *